United States Patent Office

3,849,546
Patented Nov. 19, 1974

3,849,546
PROCESS FOR OBTAINING ANTIGEN-
LIPOID EMULSIONS
Jean-Louis Beaumont, La Varenne-Saint-Hilaire, France,
assignor to Etablissement Public: Institut National de la
Santé et la Recherche Medicale, Paris, France
No Drawing. Filed Feb. 23, 1972, Ser. No. 228,741
Claims priority, application France, Feb. 26, 1971,
7106658
Int. Cl. C12k 1/00; G01n 31/02, 33/00
U.S. Cl. 424—12           8 Claims

ABSTRACT OF THE DISCLOSURE

The invention relates to a process for obtaining antigen-activated lipoid emulsions useful in seroimmunology. An antigen containing emulsion is formed in a neutral oil, which is liquid at ambient temperature, such as olive oil, with the antigen corresponding to the antibody to be detected. The antigen-emulsion is subjected to ultrasounds and then a purification process of washing. Such emulsions permit the detection of antibodies by agglutination of the lipoid emulsions, notably antibodies present in circulating blood and responsible for hyperlipidemia.

---

The object of the invention is a process for obtaining lipoid emulsions. It also relates to the products so obtained, which can be used as reagents in seroimmunology. A particularly advantageous application of said products is to permit antibodies to be revealed by the agglutination of the lipoid emulsion, notably antibodies present in circulating blood and responsible for hyperlipidemia.

In order to illustrate the invention, one of its fields of application will be described succinctly. Since 1965, it has been known that autoimmune hyperlipidemia is a disease which often results in arterial symptoms (arteriosclerosis) and which is due to the presence of antibodies, mostly antilipoproteins, in the circulating blood. Among the most representative documents of the prior art in this connection may be mentioned J. L. Beaumont's articles in "European Journal of Clinical and Biological Research" (Autoimmune hyperlipidemia, an atherogenic metabolic disease of immune origin), and in "Atherosclerosis: Proceedings of the Second International Symposium" (Autoimmune hyperlipidemia), Springer-Verlag, New York 1970. These articles contain numerous bibliographic references which complete the documentary side of the question. In the present description, the purport of these various references will not be given in detail, reference to them being sufficient to exactly place the state of the art.

It is obviously of the utmost importance to be able to detect a disease, such as autoimmune hyperlipidemia, in as simple a manner as possible. It was found, however, that the antibodies responsible for the disease are almost never precipitated and generally very slightly agglutinative, so that, even when pure antigens and antibodies are used, no detectable reaction is obtained with conventional processes (precipitation in saline solution or a gel, agglutination of sensitized red blood corpuscles or latex particles). Other methods of detection should therefore be used, notably those bringing into play the phenomenon of the agglutination of a lipoid emulsion.

The said phenomenon is characterized by the agglutination of lipoid particles of an emulsion in the presence of a serum or a serum fraction containing an antibody reacting with a substance (antigen) situated on the surface of the emulsion, this agglutination being visible by the naked eye or through a microscope. Said phenomenon is specific and can be inhibited by an excess of antigen. This phenomenon is similar to the phenomena of agglutination of red blood corpuscles or other particles (latex) activated or inactivated by other substances which are in current use nowadays to study antibodies. A lipid emulsion flocculation phenomenon is already used in serohematology for certain tests, some of an immunologic nature (Wasserman reaction), others being non specific (cephalincholesterol flocculation test).

In certain documents of the prior art, notably in the U.K. Pat. 1,163,470, it is suggested that a dry, non-toxic oil be used in the manufacture of various vaccines. Said vaccines consist of a dispersion of an antigen material in such an oil, which can notably be a vegetable oil such as olive oil or peanut oil. The products so obtained are vaccines and not reagents capable of being used for the detection of antigen-antibody reactions. Furthermore, said vaccines are manufactured by dispersing in the oil antigens which have been previously carefully dried. According to the invention, on the other hand, a process is described for obtaining activated lipoid emulsions wherein an oil-in-water emulsion is formed, with the antigen on the surface thereof. The emulsion according to the invention, which therefore contains an aqueous medium, cannot be used as a vaccine, but as an agglutination reagent.

To illustrate the agglutination technique known in the prior art using a latex, the Netherlands patent application published No. 6504823 may be mentioned.

This latter document describes a process for the preparation of a reagent for immunochemical determinations, wherein an inert substrate consisting of latex or a suspension of such an inert substrate is treated with an inert protein, after which the protein is activated by an antigen or an antibody. Said process belongs to the known technique for detecting antigen-antibody reactions. The present invention also describes a reagent of this type, but the nature of the substrate onto which the antigen is fixed is fundamentally different as, in the prior art, a latex is used, whereas the invention describes the use of an oil-in-water emulsion as a substrate.

In reality, the conventional reagents useful for the detection of various antibodies are not suited to certain applications, notably (1) those where the antibodies react with sites which are not present in said reagents and (2) those where the antibodies are only slightly able to agglutinate, as is the case with hyperlipidemia. It is therefore necessary to develop new reagents which, according to the invention, consist of an activated lipoid emulsion.

The object of the invention is therefore a general process to obtain activated lipoid emulsions.

Another object of the invention is a process providing activated lipoid emulsions differing essentially by the activating antigen.

A further object of the invention is the activated lipoid emulsions obtained by the said process.

Another object of the invention is the application of new activated lipoid emulsions as agglutination reagents which can be used in sero-immunology for the detection of antibodies.

Yet a further object of the invention is lipoid emulsion agglutination reagents, notably applied to the detection of antibodies responsible for antiimmune hyperlipidemia.

Another object of the invention is a general process for the detection of antibodies against substances which are only slightly, or not at all, hydrosoluble, that is to say, essentially lipophilic substances.

A further object of the invention is a process permitting the detection of small antigenic molecules (haptenes) owing to the use of activated lipoid emulsions.

Generally speaking, the object of the invention is a process for obtaining activated lipoid emulsions wherein an emulsion is formed in a neutral oil, liquid at ambient temperature, with a protein comprising or constituting at least one activating antigen corresponding to the antibody to be detected.

In a particular form of embodiment, the invention relates to a process for obtaining activated lipoid emulsions wherein a protein, such as β-lipoprotein, albumin from which lipids have been removed, and proteins from normal serum, is intimately contacted with a neutral oil which is liquid at ambient temperature, and a stable emulsion is formed by successive centrifugations and purifications.

From another point of view, the invention relates to a process for obtaining activated lipoid emulsions wherein a protein, onto which have been fixed molecules capable of being recognized by specific antibodies, is intimately contacted with a neutral oil liquid at ambient temperature and a stable emulsion is formed by successive centrifugations and purifications.

The proteins used to fix other molecules are, for example, beta-lipoprotein and serum albumin. The albumin is advantageously used. As molecules which can be fixed to protein, small molecules (haptenes) are notably used. Numerous examples of this will be given hereinafter.

The process of the invention will be illustrated in greater detail in the following description.

I. PREPARATION OF PROTEINS

Proteins are an essential constituent of the new lipoid emulsions. Said emulsions are activated by the said proteins owing to the process of the invention. Various activated lipoid emulsions can be obtained according to the type of protein used, that is to say according to the type of activating antigen. This characteristic is of particular interest for the detection of antiimmune hyperlipidemia or for any other disease involving antibodies, agglutination with the reagent occurring when the emulsion contains the antigen or antigens corresponding to the antibody involved.

The lipoid emulsions according to the invention are thus stabilized by the presence on their surface of proteins which, at the same time, activate them by rendering them reactive with certain antibodies. Using said activated lipoid emulsions, it is possible to recognize the presence of antibodies which react with the sites present on the proteins used for activation.

According to the invention, proteins onto which are fixed molecules capable of being recognized by specific antibodies can also be used for the preparation of activated lipoid emulsions. In this case, the lipoid emulsion, activated and stabilized by the protein, is a reagent which can be used for the detection of numerous activated antibodies directed against the sites provided by the molecules fixed to the protein (haptenes).

As an illustrative example, the preparation of certain proteins suitable for producing activated lipoid emulsions will be described hereinafter.

A. Preparation of β-lipoproteins

In a first form of embodiment, β-lipoproteins of human or animal origin are used as starting materials. The preparation of human β-lipoprotein will now be described in detail. Normal human serum (NHS) which is mixed with an equal volume of veronal buffer pH 5.5 is used. With an A. Michaelis's solution composed of 29.43 g. sodium veronal, 19.43 g. sodium acetate and distilled water (balance to 1 liter), the veronal buffer pH 5.5 is obtained by mixing 1 volume of the said A. Michaelis's solution and 9 volumes physiological saline solution (having weight amounts of 9 g. ‰ NaCl and 1 g. ‰ NaN$_3$) by adjusting the pH with HCl.

(1) Precipitation of β-lipoprotein: The NHS-veronal buffer 5.5 mixture is diluted to ½ and has an equal volume of a precipitating solution added to it. For 1 volume of said mixture diluted to ½, there is thus added 1 volume of a precipitating solution consisting of one volume of a MgCl$_2$ solution at 50 g. ‰ by weight and one volume of a heparin solution at 4 g. ‰ by weight. After intimate mixing, it is allowed to settle overnight at 4° C., it is decanted, the supernatent is thrown away and the precipitate is isolated and washed.

(2) Washing the precipitate: Washing the precipitate is carried out in several steps:

(a) Washing several times, three times for instance, with the precipitating solution described hereinabove in (1). In each of said washings, the precipitate is suspended again, centrifuged, and the washing solution is thrown away to isolate the washed precipitate.

(b) The precipitated obtained after step (a) has the veronal buffer at pH 5.5 previously defined in (1) added to it so as to obtain partial dissolution of the precipitate.

(c) A further volume by volume precipitation is carried out with the precipitating solution.

(d) Further washings are effected, two washings for example, of the precipitate obtained in (c), using the precipitating solution, under the same conditions as those described in (a);

(e) The washed precipitate obtained in step (d) is dissolved in a veronal buffer pH 7.3. The veronal buffer pH 7.3 is obtained by mixing 1 volume of the A. Michaelis solution defined in (1) wtih 9 volumes of the physiological saline solution described above, and adjusting the pH with HCl. A solution of β-lipoprotein in the said buffer is thus obtained at the end of step (e).

(3) Purification of β-lipoprotein: (a) The β-lipoprotein solution is dialyzed against a phosphate buffer 0.05 M pH 6.5. The phosphate buffers designated by the abbreviation TPO$_4$, corresponding to the formula NaH$_2$PO$_4$·H$_2$O (molecular weight 137.99).

(b) The solution is flowed into a DEAE-cellulose (diethylaminoethyl-cellulose) column equilibrated with TPO$_4$, 0.05 M, pH 6.5. Elution is effected with TPO$_4$ 0.05 M, pH 6.5 until γ-globulins are eliminated (a DO of 0 to 280 mμ is obtained), then with TPO$_4$ 0.15 M pH 6.5, which results in the elution of the β-lipoprotein fraction.

(c) The β-lipoprotein peak is dialyzed against physiological saline solution as is described above.

After these various steps, human β-lipoprotein is obtained which can be easily conserved at about +4° C.

The above procedure has been described in detail starting with human serum. The latter can be replaced by animal serum according to the application for the activated lipoid emulsion which is obtained in the manner to be described hereinafter.

Furthermore, variants can be brought to the various preceding steps. They have been described in detail hereinabove so as to render them perfect by reproducible by a man of the art. The only condition is that a purified β-lipoprotein fraction is finally obtained. The chromatographic means of purification indicated in (3) above gave good results in practice.

B. The preparation of albumin with the lipids removed or "delipidated" albumin In another form of embodiment, human or animal albumin is used as the starting material. A detailed description will now be given of the preparation of human albumin with the lipids removed, or delipidated alubumin but the latter can obviously be replaced by a product of animal origin, according to the application to which the activated lipoid emulsion finally obtained will be put.

Human albumin fraction V, sold by the firm Calbiochem, is, for example, used. The lipids are then removed from the said albumin by ordinary ether. For this purpose, the powdered albumin is placed in pots immersed in an ice bath at 0° C. and about 5 volumes of ether are added thereto. It is stirred vigorously several times, three times for example, leaving it to stand for a short time between each operation (standing time 15 min., for instance). The product is centrifuged and the ether is thrown away after separating the solid product. Ether is added to said product which is stirred again as before, after which it is centrifuged and the albumin is isolated. The operation can be repeated several times, as is usual in solvent extraction. The albumin is finally vacuum dried to obtain a lipid-free albumin.

Variations may be brought to this mode of operation. Thus, the ether may be replaced by another solvent or mixture of solvents capable of extracting the lipids from albumin, such as methylal, chlorofrom, or another solvent.

C. Proteins as agents for fixing other substances (1) With beta-lipoprotein, it is easy to fix heparin and other mucopolysaccharides onto lipoid emulsions by means of a technique described hereinafter.

(2) With albumin the possibilities are still greater than with beta-lipoprotein. It is possible, in fact, to obtain the fixation of numerous molecules onto albumin without the agency of a chemical. Said fixing is increased when the albumin has been previously freed from its lipids according to the process already described in paragraph B. It concerns very varied bodies:

(a) Lipids: albumin combined with phospholipids (mixture of phospholipids, cephalin, lecithin, sphingomyelin) was thus prepared and used. Albumin combined with fatty acids (notably oleic acid) was also used.

(b) Vitamins: albumin combined with vitamin A was prepared and used for the preparation of activated lipoid emulsions;

(c) Medicaments, notably acetylsalicylic acid and a hypocholesterolemiating agent.

(d) Mucopolysaccharides and notably heparin which can be fixed on emulsions by means of albumin, as it is by means of beta-lipoprotein.

The enumeration of these substances relates to those for which the necessary experiments have been carried out and is obviously not exhaustive. It is certain that the field of application of the process of the invention is much broader.

The durations and temperatures of antigen incubation contacted with substrate proteins such as albumin or beta-lipoprotein can be altered as a function of the antigen to be fixed, the optimal duration being from 24 to 48 h. at 4° C. It is possible to shorten this period by increasing the temperature and by incubating at 37° C. for instance.

The preparation of β-lipoproteins combined with heparin will be described by way of example.

The preparation of β-lipoproteins combined with heparin: β-lipoproteins obtained and purified as described in A, or by the variations previously mentioned, are used.

A substantially equal amount of heparin, such as 5000 $\mu$/ml. Fournier for intravenous injection is added to the β-lipoproteins and they are carefully mixed. As an illustration, 20 mg. β-lipoproteins and 20 mg. heparin are used. The mixture is incubated for a certain time (30′) at +4° C. and is then filtered through a column filled with dextran gel of a special quality for gel filtration, sold by the firm Pharmacia Uppsala under the name of "Sephadex G 200." Elution in physiological salt solution is then carried out and the peak freed from the aforesaid "Sephadex" is collected, corresponding to a fraction having a volume slightly larger than that of the sample deposited. β-lipoproteins combined with bonded heparin are thus obtained.

As in the preceding cases, the mode of operation described may be varied, notably by using animal products instead of human products, or by using other types of heparin, the only end to be attained being the isolation of a protein fraction containing β-lipoprotein combined with bonded heparin.

It will be noted that the preparation of activated lipoid emulsions with proteins containing other molecules is effected according to the same general procedure, as that described for the general case of beta-lipoprotein or albumin. The protein acting as a fixing agent only has to be prepared by special means.

Fixing onto the protein of the molecule in question can be effected either in an aqueous medium when a hydrosoluble substance (heparin for instance) is concerned or in a two phase system when the product is water-insoluble. In this case, one of the following two techniques is used.

Prolonged contact of the protein aqueous solution with the product in dry form

Prolonged contact of the protein aqueous solution with the product solubilized in another non water-immiscible phase. Said last process is notably applicable to the preparation of albumin combined with lipids (phospholipids, fatty acids, liposoluble vitamins). The solvents used for the 2nd step were ether and chloroform. Furthermore, albumin combined with certain substances can be prepared from human or animal serum which have absorbed them, the function of albumin transport being involved here. This was, for example, effected for albumin combined with a hypolipoidemiating medicament.

After fixing, the protein solution is washed either by gel filtration, chromatography or by leaching out.

When they have been washed and added to a physiological saline solution, the proteins combined with "adjuvant" or "associated" molecules are ready for the preparation of activated lipoid emulsions according to the general process described.

D. In another mode of embodiment, the normal human or animal serum is used in the natural state for the production of activated lipoid emulsions.

The preparation proper of activated lipoid emulsions will now be described.

II. THE PRODUCTION OF ACTIVATED LIPOID EMULSIONS

A neutral oil of animal or vegetable origin, liquid at ambient temperature, is used to obtain the oil-in-water emulsion. Commercial olive oil gives good results in practice and is easily available.

Generally speaking, the emulsion is prepared by mixing determined amounts of oil and protein in physiological saline aqueous solution and subjecting the mixture to the action of ultrasounds. The exact relative amounts of protein and oil vary according to the type of protein and can be determined by preliminary trials. Illustrative examples are given hereinafter. In general, it is advisable to use protein concentrations higher than 1500 γ/ml. based on the emulsion. Amounts lower than 1500 γ/ml. provide mediocre yields and the emulsions are more difficult to conserve. The optimum amounts of proteins for the preparation of emulsions are generally in the range of 2000 to 3000 γ/ml., but they vary with the type of antigen used. Higher concentrations can be used, the excess antigen then being removed during washing in "Sephadex" or "Sepharose" columns.

The emulsion is generally stabilized after treatment with ultrasounds. However, if the particles in suspension subsequently separate out during conservation, the emulsion simply has to be subjected to the action of ultrasounds for a short time just prior to use.

The emulsion is generally purified by washing. Another efficient method of purification is gel filtration. The emulsion can be conserved in plastic packaging in the presence of an inhibitor of bacterial growth. Sodium azide $NaN_3$ is preferred as an inhibitor.

Other additives can be used in the emulsion. Thus, the emulsion can be rendered more visible by precoloration.

Particular methods for preparing activated lipoid emulsions will now be described in a purely illustrative way.

A. Mixture of protein and oil

The following table gives the relative proportions of protein and olive oil which permit activated lipoid emulsions suited for the requirements of the invention to be obtained in practice. It is possible, however, to depart slightly from the exact values given, notably by varying the amount of oil. The proteins of Table I have been defined in paragraph I above.

TABLE I

| Proteins | | Olive oil, μl. |
|---|---|---|
| Lipoid emulsion activated with β-lipoproteins. | Amount: 1 ml. at #1,500 γ/ml. | 75 |
| NHS (normal human serum) activated lipoid emulsion. | Pure normal human serum (70,000 γ/ml.) Amount: 1 ml. | 25 |
| Lipoid emulsion activated with lipid-free albumin. | Lipid-freed albumin #2,000 γ/ml. Amount: 1 ml. | 200 |
| Lipoid emulsion activated with β-lipoproteins blended with heparin. | Peak excluded at filtration on "Sephadex G 200" having a — lipoprotein content of 1,500 γ/ml. Amount: 1 ml. | 75 |

B. Treatment with ultrasounds and further treatment

The oily mixture obtained in paragraph A above is subjected to the action of ultrasounds. To this end, an ultrasound probe is immersed in the tube containing the mixture, and treatment is effected for a time proportional to the volume of the mixture, notably at a rate of 1 minute per ml protein solution. It is preferable to avoid raising the temperature of the mixture, and the operation is therefore effected with cooling of the outer wall of the tube, by immersing it in an ice bath at 0° C. for instance. The action of the ultrasounds should enable all the drops of oil to be broken down.

After treatment proper with ultra-sounds, the emulsion is diluted either with a phosphate buffer or with physiological saline solution. The phosphate buffer used provides a pH of 7.3 and has the following composition:

|  | G. |
|---|---|
| Anhydrous monopotassium phosphate | 4.39 |
| Disodium phosphate 12H$_2$O | 42.20 |
| Distilled water—to make 1 liter. | |
| NaN$_3$ | 1 |

As before, the physiological saline solution contains 9 g. NaCl and 1 g. NaN$_3$ per liter of distilled water.

The preceding emulsions, apart from the emulsion containing lipid-free the albumin are diluted to ½ with the phosphate buffer described hereinabove, which is itself diluted to ⅕ in distilled water. The emulsion containing the albumin with the lipid removed is only diluted to ⅕ with physiological saline solution. In all cases, 0.5 ml. distilled water is added superficially, avoiding mixing it with the emulsified phase.

Incubation is then carried out for about ten minutes at a medium temperature, such as ambient temperature or in a water bath at 37° C. The coarsest elements float spontaneously and are eliminated by decantation. In the case of the emulsion containing β-lipoprotein-heparin, which floats on the surface, care should be taken to throw away only the supernatant drops of oil.

C. Emulsion washing

The emulsion is first subjected to a preliminary treatment permitting the coarse particles which were not thoroughly broken down by the ultrasounds and forming a skin to be removed. To this end, 0.5 ml. distilled water is deposited on the surface and the product is centrifuged at low velocity (2500 r.p.m. for one minute). The skin formed is then removed and the step is repeated several times. After having thrown away the films, an underlying product is conserved, representing the useful emulsion and which is subjected to washing proper.

The washing of emulsions containing β-lipoproteins, normal human serum and β-lipoprotein-heparin will now be described. Said emulsions, freed of their supernatant skin, are washed with the phosphate buffer pH 7.3 defined hereinabove and used at a dilution of ⅕. The emulsions are diluted to ¼ with the buffer then centrifuged at 10,000 r.p.m. with cooling. The total duration of the centrifugations is about five minutes and the velocity is not raised higher than 10,000 r.p.m. to avoid agglutination of the emulsions and other secondary phenomena. After each centrifugation, the emulsions are decanted and the supernatant is recovered; it is diluted with the phosphate buffer diluted to ⅕ and is homogenized by a further short treatment with ultrasounds. The step is repeated 4 times for the emulsions containing β-lipoproteins and normal human serum and 5 times for emulsions containing β-lipoproteins combined with heparin. Care should be taken that the ultrasound treatments between each washing should be brief (approximately 10 sec.).

Washing of emulsions containing lipid-free albumin will now be described. For this purpose, emulsions freed from their skins and having undergone incubation for 10 minutes are subjected to gel filtration. Filtration is carried out in a column filled with "Sephadex G 200" for gel filtration. Elution is effected with physiological saline solution as defined above and the fraction excluded at elution is conserved.

After the various washings, it is necessary to once more remove the skin which may have formed. For this purpose, the operation may be carried out in the usual manner by successive centrifugations, three for example, for one minute at 2500 r.p.m., depositing 0.5 ml. of distilled water on the surface. Alternatively, centrifugation may be effected in two layers at a higher velocity, such as centrifugation at 3500 r.p.m. for 2 minutes, the total centrifugation time being 5 minutes. These steps are omitted for the β-lipoproteins emulsion combined with heparin as they float to the surface naturally. It is sometimes necessary to subject said emulsion to brief action of ultrasounds prior to use.

A simplified technique for washing emulsions which has also given good results in practice will finally be given.

After treatment with ultrasounds, the emulsion is depleted of coarse, badly broken, skin-forming particles, by centrifugation for one minute at 2500 r.p.m.

The washing proper is carried out on a column of agarose, "Sepharose," or dextran gel, "Sephadex" (selected as a function of the nature of the antigen) and equilibrated with a phosphate buffer pH 7.3, 0.075 M. An excluded peak containing the activated and washed lipoid emulsion is obtained.

In practice, a phosphate buffer pH 7.3, 0.075 M or physiological saline solution is used to eluate the columns of "Sephadex" or "Sepharose" used for washing the emulsions. It is also possible to eluate said columns with buffer Tris 0.1 M at pH between 1 and 9, buffer physiological saline solution pH 7 by the tris, boric acid buffer pH 7.8, veronal buffer pH 7, or another type of buffer usual in elutions.

D. Conditioning the emulsion prior to use

It is convenient to use dilute emulsions. For example, after washing of the type described in paragraph C above, emulsions can be diluted to ½₀ m. with NaCl (physiological saline solution at ⅕) or with a phosphate buffer pH 7.3 of physiological molarity to ⅕. The emulsion thus obtained is slightly transparent, but sufficiently so when a sample of about 50 μl. of the emulsion is taken.

The emulsion can be kept in small plastic bags or tubes, such as polystyrene, tubes, at a temperature of +4° C. to 20° C. If a film should form on the surface it is enough to decant the emulsion and throw away the film. Treatment with ultrasounds prior to use is unnecessary except in the case of activated emulsions containing β-lipoproteins combined with heparin. In any case, in this last case, ultrasounds should only be applied for a brief time.

The activated lipoid emulsions can thus be used in practice as agglutination reagents. The applications and use of said emulsions will now be described.

III. APPLICATIONS OF ACTIVATED LIPOID EMULSIONS

Activated lipoid emulsions according to the invention can be used to study and reveal a whole range of antibodies and serological reactions which are not revealed by conventional reagents, notably red blood corpuscles or sensitized latex particles. Activated lipoid emulsions are thus used to detect antibodies in numerous diseases, particularly in autoimmune hyperlipidemia.

In the applications provided for by the invention the susceptibility of the emulsions to the presence of antibodies is very high. The specificity of the reactions is always easily verifiable. Furthermore, preferably clear and reproducible results are obtained.

Generally speaking, the process consists in putting very small and substantially equal amounts of an activated lipoid emulsion in the presence of the liquid medium containing the antibodies to be revealed.

Certain methods of carrying out said trials will now be given as illustrative examples.

The activated lipoid emulsions are used after having been washed and diluted with the phosphate buffer diluted to ⅕ with distilled water in the manner described in II (D) above. Place in microtubes at amounts of about 50 μl., such emulsions provide a clear, but slight, opalescence.

For the trials, 50 μl. of emulsion activated with antigens are placed in the bottom of tubes and 50 μl. of a liquid medium containing physiological saline solution containing the antibodies to be studied in the form of seriated dilution are added.

The tubes are then incubated for 1 hour at 37° C. then 1 hour at +4° C. The tubes are then centrifugated at a very high maximum speed of up to 18,000 r.p.m. for a short time and reading is effected by eye or microscope.

As a variant, incubation is effected for one night at +4° C. without subjecting the tubes to a consecutive centrifugation. The emulsions being stable, the results can be read subsequently without changes.

Reading the tubes by eye is done by transparence. The negative controls are milky and homogeneous. Positive reactions appear when the tube becomes perfectly clear and has an agglutinated surface skin.

For reading with a microscope, the agglutinated surface skin formed on the surface of the tubes is removed, and observed with a phase-contrast microscope, placing it between the slide and the cover glass. Negative controls show small, free, movable, balls. Positive tests show more or less large clumps. Reading therefore consists in observing the clumps and the more or less complete decrease of the free balls. This reading is generally very clear.

In the application of the invention to inhibition tests of the antigen-antibody reaction, the following method may be used. 50 μl. of a liquid medium containing physiological saline solution containing the antibody or antibodies and 50 μl. of a same medium containing the inhibiting antigen are first mixed. After having stirred this mixture it is incubated for 2 hours at +4° C. In a second step, 100 μl. of activated lipoid emulsion is added, the mixture is stirred slightly and incubated for one night at +4° C. Reading is carried out as hereinabove.

Finally, a simplified reading technique will be described which can also be used in the tests.

A drop of serum or fraction to be tested is placed on a glass slide. A drop of activated lipoid emulsion is then added and mixed with a stirrer.

A macroscopic reaction is immediately observed. A positive result is expressed by a clumping, of any form, of the activated lipoid particles. A negative result is expressed by an absence of clumping or agglutination.

The invention is not limited to the above specific modes of embodiment which have only been given purely by way of illustration. Thus, the process of the invention is applicable not only to the detection of autoimmune hyperlipidemia, but also of active antibodies against the antigens of lipoid emulsions comprising non-hydrosoluble substances. A large number of antibodies can thus be detected by fixing water insoluble antigens directly or by means of proteins. The process of the invention can also be used to study natural antibodies which precipitate only slightly or not at all. An advantageous application of the invention also consists in a process for titering the antibodies concerned.

By way of illustration, other examples of the preparation of lipoid emulsions will now be given in order to show the generality of application of the process of the invention. The following methods of preparation are based on the general mode of operation described hereinabove.

(1) Lipoid emulsion activated with alpha-lipoproteins

The preparation and purification of alpha-lipoproteins from normal human serum were effected according to the technique described in the article "Purification of Serum Alpha-1-Lipoprotein" by J. L. Beaumont and N. Lemort, Annales de Biologie Clinique, 1969, 27, (237–245).

For the preparation of the emulsion there is used:

Purified alpha-lipoprotein solution at a concentration of about 3000 γ/ml. and olive oil in an amount of 0.1 ml./ml. of alpha-lipoprotein solution.

The mixture is treated with ultrasounds for 1 minute per ml., giving an unwashed alpha-lipoprotein solution.

(2) Lipoid emulsion activated with desoxyribonucleic acid (DNA)

A commercial desoxyribonucleic acid solution is used at a concentration of about 3000 γ/ml.

A preliminary incubation of DNA with human lipid-free albumin is effected at a concentration of about 2000 γ/ml. in solution in a buffer of physiological pH and molarity. Incubation was effected at +4° C. for 24 to 48 hours.

Preparation of the emulsion: 0.1 ml. olive oil is added to the DNA-albumin mixture.

The mixture is treated with ultrasounds for 1 minute per ml. of solution, which gives an unwashed DNA-activated lipoid emulsion.

(3) Lipoid emulsion activated with streptolysin

Preliminary incubation: A commercial purified streptolysin solution at a concentration of about 3000 γ/ml. is incubated with a beta-lipoprotein solution of about 2,000 γ/ml., for 24 to 48 hours at + 4° C.

Preparation of the emulsion: After incubation, 0.1 ml. olive oil/ml. of the solution is added to the streptolysin + beta-lipoprotein solution.

The mixture is treated with ultrasounds for one minute per ml. of solution, which gives an unwashed, lipoid emulsion activated with streptolysin.

(4) Lipoid emulsion activated with gamma-globulin

Olive oil in an amount of 0.1 ml./ml. of the solution is added to a commercial gamma-globulin solution having a concentration of about 3,000 γ/ml.

The mixture is treated by ultrasounds for 1 minute per ml., which gives an unwashed, lipoid emulsion activated with gamma-globulin.

Washing the lipoid emulsions (1) to (4): After treatment with ultrasounds, emulsions are subjected to incubation for 10 minutes at 37° C.

They are centrifuged at 2,000 r.p.m. for 1 minute to eliminate the coarsest particles and the top skin is thrown away.

The underlying layer is washed, either by centrifugation or by filtering on a column of "Sephadex G 200" or "Sepharose," eluted with a phosphate buffer pH 7.3, 0.075 M or physiological saline solution.

(5) Lipoid emulsion activated with tissue antigens

After removal of an organ, a perfusion of physiological saline serum is effected to remove the animal's blood. A fragment of the organ (liver) is then ground in physiological saline solution at 0° C. and centrifuged. The supernatant is recovered and filtered through a Durieux filter which gives a thick liquid with a high protein concentration. This filtrate is used for preparing the lipoid emulsion. An emulsion is obtained by adding 0.1 ml. of oil to 1 ml. of the filtrate. The optimal concentration of the filtrate is about 15 mg./ml. An emulsion can be obtained from a concentration of 5 mg. proteins/ml. The concentration of the emulsion recovered increases with the concentration of the ground tissue. A highly concentrated emulsion is obtained at 40 mg./ml.

Treatment with ultrasounds lasts for 1 minute per ml. of the solution to be emulsified, as with the other preparations.

Incubation and washing in a column are also carried out in the same manner.

The additional examples (1) to (5) which have just been described can also be modified in accordance with the general indications given in the description. By way of illustration, it is also possible to prepare emulsions activated with streptolysin without preliminary incubation with beta-lipoprotein.

Similarly, gamma-globulin emulsions can be prepared after incubation in the presence of albumin; the albumin and beta-lipoprotein then act as a substrate for fixing antigens onto the emulsion.

The above process can be applied to the preparation of emulsions activated with antigens extracted from benign or malignant tumors.

It is also possible to activate emulsions with antigens of viral origin.

It is important to note the particular function performed by a protein, such as albumin, in the process of the invention. According to the invention, albumin itself is used as an antigen or as a substrate for an antigen, owing to its ability to fix haptenes, which would not be integrated with the emulsion if it were not used. In a known prior process, as the process with latex described in the Netherlands patent application published No. 6504823, the albumin which is employed is used to neutralize the inert substrate, which consists of a latex.

The invention can also be used in the field of reading without departing from its scope, thus reading can be made more sensitive by the use of an anti-antibody serum. Reading can be automated by the use of a particle counter.

All these variants lie within the scope of the invention as it is defined by the appended claims.

What is claimed is:

1. In the process of preparing a lipoid emulsion containing an antigen for immunochemical determinations, the said process comprising forming said antigen-containing emulsion in a neutral oil, which is liquid at ambient temperature, and subjecting the same to ultrasounds, the improvement comprising washing said emulsion with physiological saline solution or phosphate buffer solution having a pH of 7.3 with successive washing centrifugations and separations whereby a stable antigen-emulsion is recovered free of separate particles of said antigen.

2. The process of claim 1 wherein said antigen is a haptene fixed on a protein carrier.

3. The process of claim 1 wherein said antigen is a protein.

4. The process of claim 3 wherein said protein is selected from the group consisting of α-lipoproteins, β-lipoproteins, lipid-free albumin, streptolysine and gamma-globulins.

5. The process of claim 3 wherein said protein is a protein obtained from tissue extracts.

6. The process of claim 3 wherein said protein is a protein from normal serum.

7. A lipoid emulsion containing an antigen for immunochemical determinations obtained by the process of claim 1.

8. In the process of preparing a lipoid emulsion containing an antigen from immunochemical determinations, the said process comprising forming said antigen-containing emulsion in a neutral oil which is liquid at ambient temperature, and subjecting the same to ultrasounds, the improvement comprising washing and filtration on dextran gel with elution of said emulsion with physiological saline solution or phosphate buffer solution having a pH of 7.3 whereby a stable antigen-emulsion is recovered free of separate particles of said antigen.

References Cited
UNITED STATES PATENTS 3,553,311   1/1971   Smith _____ 424—3

OTHER REFERENCES

Kwapinski; Methods of Serol. Res., John Wiley & Sons, N.Y. 1965, pp. 184–194, 202, 203, 315, 316, 326, 327.

Chem. Abs., Vol. 62, 1965, p. 9618f.

Chem. Abs., Vol. 68, 1968, No. 11252 p.

Chem. Abs., Vol. 69, 1968, Nos. 50524u; 50525v, 50526 w, and 50530t.

Chem. Abs., Vol. 71, 1969, Nos. 58967c, 67377n.

Chem. Abs., Vol. 73, 1970, Nos. 118605m, 12556f.

Chem. Abs., Vol. 74, 1971, No. 74272q.

Chem. Abs., Vol. 75, 1971, No. 17804m.

Tullis: Blood Cells & Plasma Proteins, Academic Press, N.Y., 1953, pp. 337–342, 350–353, 358–360, 371–373.

ALBERT T. MEYERS, Primary Examiner

A. P. FAGELSON, Assistant Examiner

U.S. Cl. X.R.

424—8, 13, 85, 88, 172